United States Patent [19]

Rastas et al.

[11] 4,383,979
[45] May 17, 1983

[54] PROCESS FOR THE RECOVERY OF ZINC, COPPER AND CADMIUM IN THE LEACHING OF ZINC CALCINE

[75] Inventors: Jussi K. Rastas, Pori; Lars-Göran Björkqvist, Kokkola, both of Finland; Raija-Leena Gisler, Altdorf, Switzerland; Simo S. Liukkonen, Espoo, Finland

[73] Assignee: Outokumpu Oy, Helsinki, Finland

[21] Appl. No.: 181,651

[22] Filed: Aug. 26, 1980

Related U.S. Application Data

[63] Continuation of Ser. No. 933,653, Aug. 15, 1978, abandoned.

[30] Foreign Application Priority Data

Aug. 18, 1977 [FI] Finland ................................. 772468

[51] Int. Cl.$^3$ .......................... C01G 3/10; C01G 9/06; C01G 11/00; C01G 49/00
[52] U.S. Cl. ....................................... 423/36; 423/146; 423/41; 423/106; 423/109; 423/DIG. 15; 75/101 R; 75/120
[58] Field of Search ..................... 423/36, 41, 27, 106, 423/109, 658.5, DIG. 15; 75/101 R, 120

[56]  References Cited

U.S. PATENT DOCUMENTS

| 3,305,353 | 2/1967 | Duncan et al. | 423/109 |
| 3,791,595 | 2/1974 | Aubrey . | |
| 3,959,437 | 5/1976 | Rastas et al. | 423/36 |
| 3,985,857 | 10/1976 | Menendez et al. | 423/36 |
| 4,119,699 | 10/1978 | Kellerwessel | 423/109 |

Primary Examiner—Herbert T. Carter
Attorney, Agent, or Firm—Brooks, Haidt, Haffner & Delahunty

[57]  ABSTRACT

Zinc, copper and cadmium are recovered from their ferrites by subjecting the ferrites to a sulfuric acid bearing solution in the presence of potassium, sodium or ammonium ions under atmospheric conditions at 80°–105° C. to precipitate the iron present in the ferrites as jarosite, separating at least a portion of the jarosite-bearing solid material from the solution before recycling the solution to a neutral leach, from which a copper and cadmium bearing solution is recovered and to which acid and calcine are also fed, feeding the solid obtained from the neutral leach to the said ferrite treatment stage classifying the solid obtained from the neutral leach into a finer and coarser fraction, feeding the finer fraction to the ferrite treatment stage, comminuting the coarser fraction by grinding, leaching or milling and recycling the comminuted fraction to the process.

6 Claims, 3 Drawing Figures

PROCESS FOR THE RECOVERY OF ZINC, COPPER AND CADMIUM IN THE LEACHING OF ZINC CALCINE

This is a continuation of application Ser. No. 933,653, filed Aug. 15, 1978, and now abandoned.

BACKGROUND OF THE INVENTION

The present invention relates to a process for the recovery of zinc, copper and cadmium from their ferrites by treating the ferrites under atmospheric conditions in a sulfuric acid bearing solution in the presence of potassium, sodium or ammonium ions at 80°–105° C. in order to precipitate, as jarosite, the iron present in the ferrites, by extracting at least a portion of the jarosite-bearing solid from the solution before the solution is returned to the neutral leach, to which acid and calcine are also fed and from which the solution containing zinc, copper and cadmium is recovered, and by feeding the solid obtained from the neutral leach to the said ferrite treatment stage.

U.S. Pat. No. 3,959,437 and U.S. patent application Ser. No. 771,661 disclose a leaching process for zinc calcine, which is divided into a neutral leach and a treatment stage for ferritic solid.

The process of U.S. Pat. No. 3,959,437 generally proceeds as follows: a raw material generally referred to as calcine, containing the ferrite of non-ferrous metal as well as the oxide of the non-ferrous metal is subjected to a neutral leach which substantially dissolves the oxide, but leaves the ferrite substantially unaffected. The non-ferrous metal values in solution are recovered and the undissolved ferrite material is further treated in a "conversion" stage with sulfuric acid bearing solution at atmospheric pressure and at a temperature of about 80° C. to about 105° C. in the presence of alkali or $NH_4^+$ ions. Under these conditions the non-ferrous metals dissolve as sulfates while iron is simultaneously precipitated as an insoluble complex sulfate known as jarosite which can be readily separated from the solution. The process has the advantages of simplicity in that it omits steps previously thought necessary in the removal of ferritic iron from calcine and of elegance in its one-step "conversion" of the ferritic material to jarosite.

The purpose of the neutral leach is to dissolve as completely as possible the principal component of the calcine, zinc oxide (ZnO), and to produce a raw solution, an iron-free zinc sulfate solution, having a pH value within the range 4–5.

During the neutral leach, not only the zinc oxide but also the zinc sulfate, which always constitutes a small percentange of the calcine, is dissolved on the other hand, the ferrites and unroasted sulfides of the calcine remain undissolved. The raw solution produced by the neutral leach contains, in addition to zinc, other heavy metals (Cu, Cd, Co, Ni, . . . ) which are regarded as impurities and which must be removed from the solution before the electrolysis in which the zinc is deposited on the cathode.

The ferritic solid remaining after the neutral leach of the calcine is fed according to U.S. Pat. No. 3,959,437 to its treatment stage to which a suitable quantity of electrolysis return acid, sulfuric acid and some suitable ammonium, sodium or potassium compound, usually their sulfates, are added. During the ferrite treatment stage the non-ferrous metals (Zn, Cu, Cd) of the ferrites pass into the solution as sulfates and the iron passes through the solution to the jarosite formed during the same stage. The treatment period and the reaction conditions are selected so that at the end of the stage the solid material is virtually devoid of ferrites and the iron content in the solution is so low that the solution can be returned directly to the neutral leach.

The following sum reaction occurs at the ferrite treatment stage (1)

(A = $NH_4$, Na, K)
and it consists of the partial reactions (2)

and (3)

In selecting the reaction conditions the aim is that Reactions (2) and (3) proceed during the same stage to as high a degree as possible, i.e. that the ferrites dissolve virtually completely and the iron which has thereby passed into the solution is precipitated almost completely as jarosite, in which case the sulfuric acid produced in the precipitation of iron is immediately consumed in the leaching of the ferrites. This procedure is disclosed in U.S. Pat. No. 3,959,437.

According to our studies the velocity of Reaction (2) depends on the ferrite concentration of the reaction mixture, on the particle size distribution of the ferrites, and on the sulfuric acid concentration and temperature of the solution. Generally the velocity $r_{(2)}$ of Reaction (2) can be expressed as follows:

$$r_{(2)} = d[Fe]_{(2)}/dt = f_{(2)}(T, [H_2SO_4], [ZnFe_2O_4], S_i, f_i), \quad (4)$$

where
T = temperature
t = time
[ ] = concentration
i = index expressing the particle size class
$S_i$ = specific surface area of the particle size class
$f_i$ = particle size class as proportion of total mass.

The dissolving velocity of each particle size class follows the formula $$dx_i/dt = k([H_2SO_4], T) \cdot S_{io} \cdot (1-x_i)^{\frac{2}{3}} \quad (5)$$

where
$x_i$ = the extent of dissolving of particle size class i
k = reaction velocity coefficient
$S_{io}$ = specific surface area of particle size class at t = 0.

From Equation (5) we obtain $$x_i = 1 - (1 - K_i t)^3 \quad (6)$$

where $$K_i = \frac{1}{3} S_{io} k([H_2SO_4], T). \quad (7)$$

By taking into account the particle size classes of the ferrites and the extents of dissolving, the following expression is obtained for the average extent of dissolving x of the entire ferritic material $$x = {}_i\Sigma f_{io} x_i = {}_i\Sigma f_{io}[1 - (1 - K_i t)^3] \quad (8)$$

where $f_{io}$ is the proportion of the particle size class i of the total mass at $t=0$.

According to our studies the velocity of Reaction (3) for its part is dependent on the iron (III), sulfuric acid and A concentration of the solution, the jarosite concentration of the reaction mixture ([AJ]) and the temperature, i.e. it can be expressed as follows:

$$r_{(3)} = -d[Fe]_{(3)}/dt = f_{(3)}(T, [Fe], [H_2SO_4], [AJ], [A]). \quad (9)$$

According to our extensive experimental observations, the velocity $r_{(3)}$ of Reaction 3 at the ferrite treatment stage can be estimated relatively accurately using the function $$r_{(3)} = -d[Fe]_{(3)}/dt = k(T)[Fe]^\alpha [H_2SO_4]^\beta [AJ]^\gamma [A]^\delta, \quad (10)$$

where the exponents $\alpha, \beta, \gamma$ and $\delta$ are constant and the reaction velocity coefficient k is dependent on the temperature.

As shown in U.S. patent application Ser. No. 771,661, it was surprising that Reaction (3), i.e. the precipitation velocity of iron(III), is dependent on the jarosite concentration of the reaction mixture within a wide range of concentrations. In Equation (10) the exponent $\gamma$ of the concentration of A-jarosite (A=$NH_4$, Na, K) has an approximate value of 1. Obviously Reaction (3) includes some stage which affects its velocity substantially and which occurs on the surface of the jarosite crystal, in which case an increased jarosite surface area increases the velocity of Reaction (3).

In U.S. patent application Ser. No. 771,661 it is shown how the dependence discussed above can be exploited in order to increase the velocity of Reaction (3) and thereby also that of Sum Reaction (1), the final aim being to achieve—by the procedure indicated in the claims of the patent application—an improved leaching process for zinc calcine.

Formulas (4)-(8) show that that part of the velocity of Reaction (2)—and thereby of Sum Reaction (1)—which is dependent on the particle size distribution of the ferrites—more precisely quantities $f_{io}$ and $S_{io}$—cannot be affected by the process disclosed in U.S. patent application Ser. No. 771,661.

Some effect can be exerted on the particle size distribution of the ferrites by a selection of the roasting conditions within the limits of the roasting condition range available. Primarily the variables $f_{io}$ and $S_{io}$ seem, however, to be concentratespecific, i.e. determined by the composition and structure of the concentrate, which cannot be greatly affected by the selection of the roasting conditions, primarily the temperature—within the limits that are possible taking into consideration the roasting capacity.

Table 1 is a compilation of the particle size distributions of some ferritic solids. The ferrites were prepared by roasting, within the temperature range 900°-1000° C. and under oxidizing conditions, various zinc concentrates and by selectively leaching the oxides out of the calcines under conditions (T=80° C., pH=1.5-2.0) in which ferrites remain undissolved. It will be seen from this table and from the examples that follow, that substantially all of the particles in the finer fraction are less than 37 μm in size whereas most particles in the coarser fraction are larger than 37 μm.

TABLE 1

Particle size distributions of certain ferritic solids.

| i | d/μm | 1 | 2 | $f_{io}$ 3 | 4 | 5 |
|---|---|---|---|---|---|---|
| 1 | −5 | 0.570 | 0.419 | 0.187 | 0.038 | 0.211 |
| 2 | 5-10 | 0.035 | 0.056 | 0.215 | 0.217 | 0.185 |
| 3 | 10-20 | 0.035 | 0.063 | 0.083 | 0.070 | 0.238 |
| 4 | 20-37 | 0.063 | 0.088 | 0.208 | 0.313 | 0.246 |
| 5 | 37-74 | 0.114 | 0.109 | 0.147 | 0.129 | 0.082 |
| 6 | 74-149 | 0.153 | 0.148 | 0.128 | 0.170 | 0.031 |
| 7 | 149− | 0.030 | 0.117 | 0.032 | 0.063 | 0.007 |

Table 2 shows a compilation of the $S_{io}$ values of the ferrites of Table 1.

TABLE 2

$S_{io}$ values of ferrites of Table 1

| i | d/μm | 1 | 2 | $S_{io}/m^2 g^{-1}$ 3 | 4 | 5 |
|---|---|---|---|---|---|---|
| 1 | −5 | 7.7 | 5.7 | 0.58 | 2.0 | 0.46 |
| 2 | 5-10 | 3.5 | 2.5 | 0.44 | 1.1 | 0.30 |
| 3 | 10-20 | 2.7 | 1.6 | 0.38 | 0.76 | 0.24 |
| 4 | 20-37 | 1.9 | 0.88 | 0.33 | 0.55 | 0.19 |
| 5 | 37-74 | 1.3 | 0.70 | 0.28 | 0.40 | 0.15 |
| 6 | 74-149 | 0.91 | 0.37 | 0.24 | 0.28 | 0.12 |
| 7 | 149− | 0.57 | 0.21 | 0.19 | 0.19 | 0.09 |

We have explained the dependence of the reaction velocity constant $k([H_2SO_4], T)$ on the sulfuric acid concentration and the temperature, in which case, using Formula (8), the extent of dissolving x of the ferrites 1-5 and the extents of dissolving $x_i$ of the particle size classes can be calculated as funtions of time at certain values of the sulfuric acid concentration and temperature of the solution.

Table 3 shows quantities x and $x_i$ of the ferrites 1-5 as funtions of variable t. The sulfuric acid concentration and the temperature of the solution had values $[H_2SO_4]=40$ g/l and T=95° C. The column $t_{xi=1.0}$ shows the time required for the complete dissolving of each particle size class.

TABLE 3 x and $x_i$ values of ferrites 1-5 as functions of time where $[H_2SO_4]$ = 40 g/l and T = 95° C.

| d/μm | $f_i(n)$ | $f_i(k)$ | $t_{xi=1.0}$ h | t = 0.5 h | 1.0 h | 2.0 h | $x_i$/— 4.0 h | 7.0 h | 12.0 h | 25.0 h |
|---|---|---|---|---|---|---|---|---|---|---|
| −5 | 0.570 | 0.811 | 0.66 | 0.985 | 1.0 | | | | | |
| 5-10 | 0.035 | 0.050 | 1.5 | 0.711 | 0.966 | 1.0 | | | | |
| 10-20 | 0.035 | 0.050 | 1.9 | 0.600 | 0.894 | 1.0 | | | | |
| 20-37 | 0.063 | 0.089 | 2.7 | 0.458 | 0.749 | 0.982 | 1.0 | | | |
| 37-74 | 0.114 | | 3.8 | 0.341 | 0.594 | 0.889 | 1.0 | | | |
| 74-149 | 0.153 | | 5.6 | 0.245 | 0.446 | 0.734 | 0.977 | 1.0 | | |
| +149 | 0.030 | | 9.0 | 0.158 | 0.299 | 0.531 | 0.543 | 0.989 | 1.0 | |
| | | | | 0.717 | 0.827 | 0.931 | 0.983 | 0.999 | 1.0 | 1.0 |

$$x = \sum_{i=1}^{n} f_i \cdot x_i$$

TABLE 3-continued x and $x_i$ values of ferrites 1-5 as functions of time where $[H_2SO_4] = 40$ g/l and T = 95° C.

| $x = \sum_{i=1}^{k} f_i \cdot x_i$ | | | | 0.883 | 0.971 | 0.998 | 1.0 | 1.0 | 1.0 | 1.0 |
|---|---|---|---|---|---|---|---|---|---|---|

| $\frac{d}{\mu m}$ | $f_i(n)$ | $f_i(k)$ | $t_{xi=1.0}$ h | t = 0.5 h | 1.0 h | 2.0 h | $x_i/-$ 4.0 h | 7.0 h | 12.0 h | 25.0 h |
|---|---|---|---|---|---|---|---|---|---|---|
| -5 | 0.419 | 0.669 | 0.90 | 0.913 | 1.0 | 1.0 | | | | |
| 5-10 | 0.056 | 0.089 | 2.0 | 0.574 | 0.871 | 1.0 | | | | |
| 10-20 | 0.063 | 0.101 | 3.2 | 0.403 | 0.680 | 0.950 | 1.0 | | | |
| 20-37 | 0.088 | 0.141 | 5.8 | 0.237 | 0.434 | 0.719 | 0.970 | 1.0 | | |
| 37-74 | 0.109 | | 7.4 | 0.190 | 0.355 | 0.614 | 0.905 | 0.999 | 1.0 | |
| 74-149 | 0.148 | | 14 | 0.104 | 0.201 | 0.373 | 0.640 | 0.879 | 0.998 | 1.0 |
| +149 | 0.117 | | 24 | 0.060 | 0.118 | 0.227 | 0.416 | 0.638 | 0.870 | 1.0 |
| $x = \sum_{i=1}^{n} f_i \cdot x_i$ | | | | 0.504 | 0.631 | 0.747 | 0.865 | 0.940 | 0.984 | 1.0 |

| $x = \sum_{i=1}^{k} f_i \cdot x_i$ | | | | 0.736 | 0.876 | 0.955 | 0.996 | 1.0 | 1.0 | 1.0 |
|---|---|---|---|---|---|---|---|---|---|---|

| $\frac{d}{\mu m}$ | $f_i(n)$ | $f_i(k)$ | $t_{xi=1.0}$ h | t = 0.5 h | 1.0 h | 2.0 h | $x_i/-$ 4.0 h | 7.0 h | 12.0 h | 25.0 h |
|---|---|---|---|---|---|---|---|---|---|---|
| -5 | 0.178 | 0.270 | 8.8 | 0.161 | 0.304 | 0.539 | 0.838 | 0.992 | 1.0 | |
| 5-10 | 0.215 | 0.310 | 12 | 0.124 | 0.237 | 0.433 | 0.718 | 0.937 | 1.0 | |
| 10-20 | 0.083 | 0.120 | 14 | 0.107 | 0.205 | 0.381 | 0.650 | 0.887 | 0.998 | 1.0 |
| 20-37 | 0.208 | 0.300 | 16 | 0.093 | 0.179 | 0.336 | 0.587 | 0.831 | 0.987 | 1.0 |
| 37-74 | 0.147 | | 18 | 0.081 | 0.157 | 0.296 | 0.527 | 0.769 | 0.961 | 1.0 |
| 74-149 | 0.128 | | 21 | 0.069 | 0.135 | 0.258 | 0.467 | 0.701 | 0.919 | 1.0 |
| +149 | 0.032 | | 26 | 0.057 | 0.112 | 0.216 | 0.398 | 0.615 | 0.849 | 0.999 |
| $x = \sum_{i=1}^{n} f_i \cdot x_i$ | | | | 0.107 | 0.206 | 0.379 | 0.637 | 0.856 | 0.976 | ~1.0 |

| $x = \sum_{i=1}^{k} f_i \cdot x_i$ | | | | 0.123 | 0.234 | 0.426 | 0.703 | 0.914 | 0.996 | 1.0 |
|---|---|---|---|---|---|---|---|---|---|---|

| $\frac{d}{\mu m}$ | $f_i(n)$ | $f_i(k)$ | $t_{xi=1.0}$ h | t = 0.5 h | 1.0 h | 2.0 h | $x_i/-$ 4.0 h | 7.0 h | 12.0 h | 25.0 h |
|---|---|---|---|---|---|---|---|---|---|---|
| -5 | 0.038 | 0.059 | 2.6 | 0.473 | 0.767 | 0.988 | 1.0 | | | |
| 5-10 | 0.217 | 0.340 | 4.8 | 0.280 | 0.503 | 0.800 | 0.995 | 1.0 | | |
| 10-20 | 0.070 | 0.110 | 6.8 | 0.206 | 0.382 | 0.651 | 0.932 | 1.0 | | |
| 20-37 | 0.313 | 0.491 | 9.3 | 0.153 | 0.289 | 0.516 | 0.815 | 0.985 | 1.0 | |
| 37-74 | 0.129 | | 13 | 0.113 | 0.216 | 0.399 | 0.675 | 0.907 | 0.999 | 1.0 |
| 74-149 | 0.170 | | 18 | 0.081 | 0.157 | 0.297 | 0.529 | 0.771 | 0.963 | 1.0 |
| +149 | 0.063 | | 28 | 0.053 | 0.105 | 0.202 | 0.375 | 0.587 | 0.820 | 0.999 |
| $x = \sum_{i=1}^{n} f_i \cdot x_i$ | | | | 0.173 | 0.317 | 0.533 | 0.775 | 0.918 | 0.982 | ~1.0 |

| $x = \sum_{i=1}^{k} f_i \cdot x_i$ | | | | 0.221 | 0.400 | 0.655 | 0.900 | 0.993 | 1.0 | 1.0 |
|---|---|---|---|---|---|---|---|---|---|---|

| $\frac{d}{\mu m}$ | $f_i(n)$ | $f_i(k)$ | $t_{xi=1.0}$ h | t = 0.5 h | 1.0 h | 2.0 h | $x_i/-$ 4.0 h | 7.0 h | 12.0 h | 25.0 h |
|---|---|---|---|---|---|---|---|---|---|---|
| -5 | 0.211 | 0.333 | 11 | 0.129 | 0.247 | 0.450 | 0.739 | 0.950 | 1.0 | |
| 5-10 | 0.185 | 0.292 | 17 | 0.085 | 0.166 | 0.312 | 0.552 | 0.795 | 0.974 | 1.0 |
| 10-20 | 0.238 | 0.375 | 22 | 0.068 | 0.132 | 0.253 | 0.459 | 0.691 | 0.912 | 1.0 |
| 20-37 | 0.246 | | 27 | 0.054 | 0.107 | 0.206 | 0.381 | 0.592 | 0.827 | 0.999 |
| 37-74 | 0.082 | | 34 | 0.044 | 0.086 | 0.167 | 0.314 | 0.501 | 0.731 | 0.982 |
| 74-149 | 0.031 | | 43 | 0.034 | 0.068 | 0.133 | 0.254 | 0.413 | 0.625 | 0.926 |
| +149 | 0.007 | | 58 | 0.026 | 0.051 | 0.100 | 0.193 | 0.320 | 0.501 | 0.816 |
| $x = \sum_{i=1}^{n} f_i \cdot x_i$ | | | | 0.077 | 0.150 | 0.282 | 0.496 | 0.714 | 0.895 | 0.995 |

| $x = \sum_{i=1}^{k} f_i \cdot x_i$ | | | | 0.093 | 0.180 | 0.336 | 0.579 | 0.808 | 0.959 | 1.0 |
|---|---|---|---|---|---|---|---|---|---|---|

Tables 1-3 show the results of our studies:
1. In general the ferrites of zinc calcine are finely-divided, in which case the bulk of the mass of each ferrite falls into particle size classes 1-4 (0-37 μm), sometimes even into classes 1-3 (0-20 μm).
2. The specific surface areas $S_{io}$ of the same size classes of different ferrites deviate considerably from each other, i.e., the porosity and the particle shapes of the ferrites deviate considerably from each other.
3. The dissolving of the coarser particle size classes of the ferrites (i=5-7 or 4-7), the proportion of the mass of which is usually within 0.2-0.4, clearly requires a longer time than would be necessary for the more finely-divided bulk of the ferrites. Thus, the complete dissolving of the coarser portion of the ferrites requires a long retention time, and in order to implement this, a relatively large reactor volume must be reserved even though the finely-divided bulk of the ferrite has already dissolved at the beginning of the reactor row.

SUMMARY OF THE INVENTION

According to the invention it has now been found advantageous to classify the ferritic solid emerging from the neutral leach into two parts, in which case the finely-divided portion—usually the main portion—is fed directly to the ferrite treatment stage and the coarser portion is refed to the process via an intermediate treatment stage. The intermediate treatment stage can be, for example, a suitable ferrite comminution stage. The intermediate treatment stage can to great advantage be a fluidized-bed or agitated fluidized-bed reactor system which is placed before the ferrite treatment stage and through which part or all of the return and sulfuric acid solution to be fed to the ferrite treatment stage is directed. By a suitable design of the reactor, a suitable mixing and solution flow rate, and a suitable temperature control it is ensured that the coarse ferrites classified by hydrocyclone separation will remain in the reactor system and dissolve in it until their size is so small that the solution flow carries them on to the ferrite treatment stage. A suitable temperature in the reactor system is within the range 70°–100° C. The coarse inert material accumulating in the reactors is removed from the reactor system by means of momentary solution flow pulses or by some other suitable method.

DESCRIPTION OF THE PREFERRED EMBODIMENTS

Figure 2:
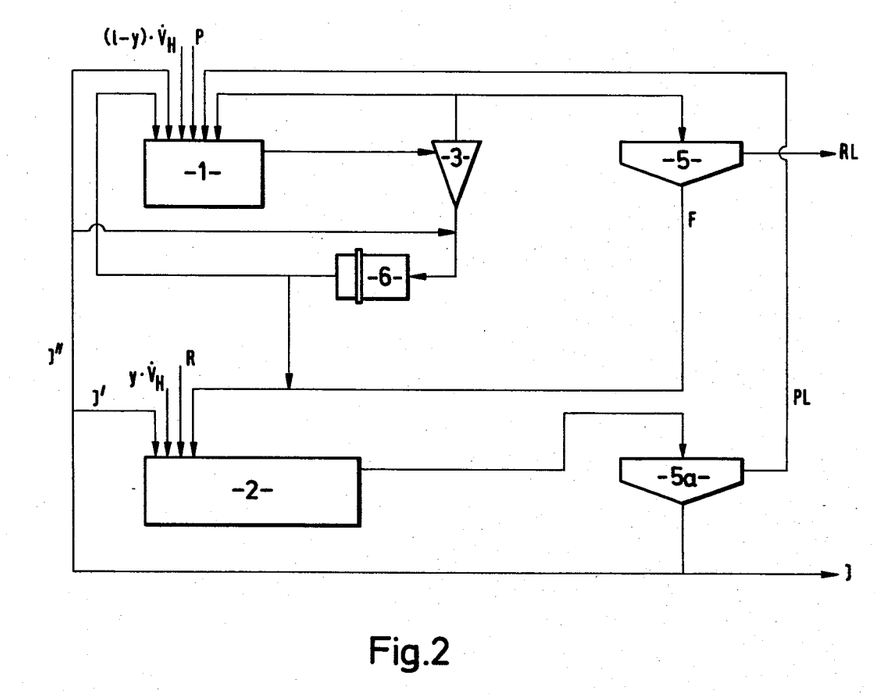
Figure 3:
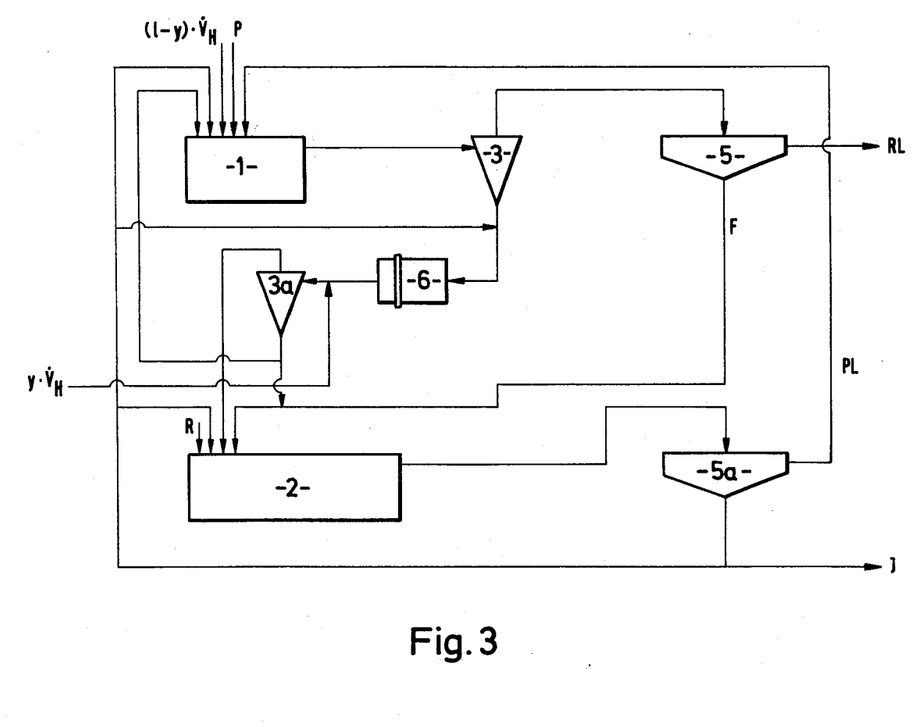

The slurry from the neutral leach is fed into a hydrocyclone. By a suitable selection of the hydrocyclone it can be ensured that the classification of the ferritic solid material into a finely-divided portion passing along with the overflow and a coarse portion passing along with the underflow can be set at an arbitrary point. The overflow is led to a thickener, the overflow of which—the raw solution—passes to the solution purification stage and its underflow to the ferrite leach. The underfow from the hydrocyclone is fed to the intermediate treatment stage, where the coarse ferrite is either dissolved or ground to a sufficiently small particle size. In the embodiment shown in FIG. 1, the underflow of the hydrocyclone 3 is fed to the fluidized-bed reactor system 4. A portion or all of the return and sulfuric acid solution to be fed to the ferrite treatment stage is fed through it. The overflow of the reactor system 4—and along with it the ferrite particles which have dissolved to a sufficiently small size—are fed to the ferrite treatment stage 2 to which the finely-divided bulk of the ferrites—separated by the hydrocyclone 3 and settled in thickener 5—is also fed. If desired, the coarse oxide phase passing along with the underflow of the hydrocyclone 3 can be leached before the reactor system 4, and the oxide-free solid can be fed after the separation to the stage 4 and the solution to the neutral leach. In FIG. 2 the output of the mill is fed to the neutral leach and the ferrite treatment stage. The flows directed to these stages can be varied within wide limits, in which event, in extreme cases the entire output of the mill 6 is fed, either to the former or to the latter stage. In FIG. 3 the output of the mill 6 is fed to the hydrocyclone 3a, the overflow of which passes on to the ferrite treatment stage 2 and the underflow to the neutral leach 1; the underflow of the hydrocyclone also has a connection to the ferrite treatment stage 2, through which any inert, coarse solid gradually accumulating in the circuit 1-3-6-3a can be directed out of the circuit. A portion of the jarosite to be returned to the process can also be circulated via the mill, in which case the jarosite which has passed the milling operation is more finely-divided and its surface area is greater. In this case it, when fed to the stage 2, increases the velocity of Reaction (3) relatively more than uncomminuted jarosite.

In the drawing, the symbols are as follows

| | |
|---|---|
| 1 | neutral leach |
| 2 | ferrite treatment stage |
| 3 3a | hydrocyclones |
| 4 | fluidized-bed reactor system |
| 5, 5a | thickeners |
| 6 | mill |
| P | calcine |
| H | return acid |
| RL | raw solution |
| F | ferritic solid |
| J | iron precipitate (jarosite precipitate) |
| R | sulfuric acid + ammonium, sodium or potassium sulfate |
| PL | treatment stage return acid |
| J' | jarosite precipitate portion returned to ferrite treatment stage |
| J" | jarosite precipitate portion to be returned to neutral leach and thereby returning to ferrite treatment stage |

Before giving the examples of embodiments of the invention, reference is made to Table 3. In it the row $$x = \sum_{i=1}^{n} f_i \cdot x_i$$

shows the total extent of dissolving of ferrite and row $$x(i = 1 - k) = \sum_{i=1}^{k} f_i \cdot x_i$$

the extent of dissolving of ferrite in a case in which ferrite has only particle size classes i=1-k.

The ferrite treatment stage comprises a series reactor, in which a stationary state prevails in each reactor, and Reactions (2) and (3) proceed in them at constant velocities. The ferrite feed rate $\dot{m}_F$ being determined, Sum Reaction (1) (Reactions (2) and (3)) and the conditions set for the leaching system determine precisely the feed of return acid $y \cdot V_H$ to the stage 2 and the feeds $\dot{m}(H_2SO_4)$ and $\dot{m}(A_2SO_4)$ indicated by R in the formulas in Appendices 1 and 2. The ferritic solid carries along with it to the stage 2 a small amount of raw solution and the jarosite $\dot{m}(J'')$ circulated via the neutral leach; in addition, a certain amount of jarosite $\dot{m}(J')$ is fed directly to the stage 2.

The length of the reactor series required for the stage 2 is determined by the factors which affect the velocity of Reaction (1) (Reactions (2) and (3)) and by the conditions set for the stage to fulfil, as well as the reactor distribution to be used in the stage 2, i.e. the reaction time distribution $t_1, t_2, \ldots, t_n$ (n reactors), in which case $t_i$ represents the retention time of the reaction suspension of the stage 2 in reactor i of the series reactor.

EXAMPLE 1

Figure 1:
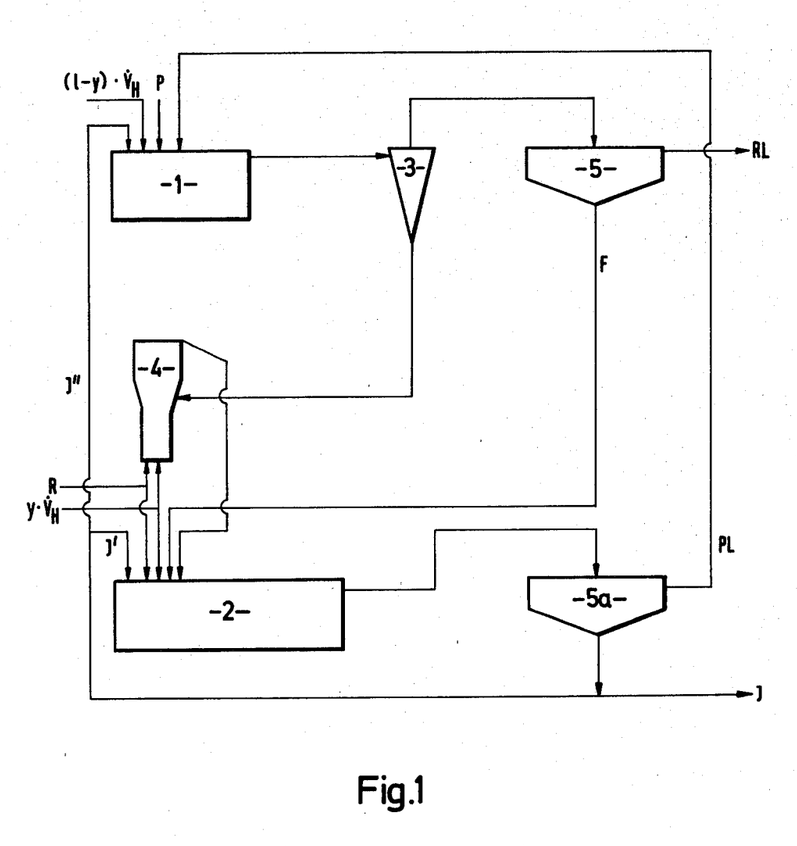
FIGS. 1-3 illustrate schematically three ways in which the present invention can be applied to the zinc calcine leaching system.

The coupling of the leach system is shown in FIG. 1.
The analysis of the zinc calcine as regards the components discussed herein is shown below. The zinc compound concentrations and the distribution of zinc over the zinc compounds present in the calcine are also shown.

|   | Analysis of calcine % | Zinc compounds in calcine | % | Distribution of zinc over zinc compounds in calcine % |
|---|---|---|---|---|
| Zn | 56.6 | ZnO | 57.4 | 81.4 |
| Fe | 12.4 | ZnSO$_4$ | 7.0 | 5.1 |
| S$_s$ | 0.2 | ZnFe$_2$O$_4$ | 26.8 | 12.8 |
| S$_{SO4}$ | 1.4 | ZnS | 0.6 | 0.7 |
| Cu | 1.13 | | | |
| Cd | 0.26 | | | |

The particle size distribution of the ferrite passing on to the hydrocyclone 3 from the neutral leach was as follows:

| i | d/μm | f$_{io}$ |
|---|---|---|
| 1 | –5 | 0.066 |
| 2 | 5–10 | 0.133 |
| 3 | 10–20 | 0.135 |
| 4 | 20–37 | 0.256 |
| 5 | 37–74 | 0.201 |
| 6 | 74–149 | 0.156 |
| 7 | 149– | 0.053 |

The particle size distribution of the ferritic solid of the overflow of the hydrocyclone 3 was as follows:

| Sieve mesh μm | Passage through the sieve % |
|---|---|
| 53 | 99.7 |
| 37 | 98.9 |
| 20 | 59.5 |
| 10 | 35.7 |
| 5 | 12.0 |

The solid content in the underflow of the hydrocyclone was 820 g/l and the particle size distribution of the ferrite was as follows:

| Sieve mesh μm | Passage through the sieve % |
|---|---|
| 425 | 97.0 |
| 425 | 97.9 |
| 149 | 88.4 |
| 74 | 54.1 |
| 53 | 29.9 |
| 37 | 11.3 |
| 20 | 2.3 |

In the fluidized-bed leach reactor the suspension temperature was approx. 90° C. The average particle size of the solid passing along with the overflow of the reactor was approx. 20 μm and the proportion by weight of the solid was approx. 20% of the ferrite fed into the reactor.

The inert solid material—mainly lead sulfite—was removed from the fluidized-bed leach reactor and its proportion by weight was approx. 6% of the ferrite fed into the reactor.

The combined ferrite passing to the stage 2 from the overflow of the fluidized-bed leach reactor 4 and the underflow of the thickener 5 had the following particle size distribution and specfic surface area.

| i | d/μm | f$_{io}$ | S$_{io}$/m$^2$/g |
|---|---|---|---|
| 1 | –5 | 0.103 | 1.2 |
| 2 | 5–10 | 0.205 | 0.68 |
| 3 | 10–20 | 0.289 | 0.47 |
| 4 | 20–37 | 0.394 | 0.34 |
| 5 | 37– | 0.009 | 0.26 |

The ferrite treatment stage comprised a 13-part series reactor, the retention times of the reactors being 0.5 for the first two and 1 h for the rest, the total retention time thus being 12 h.

The results of the experiment have been calculated as per a calcine feed of $\dot{m}_p = 1$ t/h.

Using the above symbols, the quantities illustrating the behavior of the leaching process were as follows:

| | |
|---|---|
| Sulfuric acid concentration of the return acid | [H$_2$SO$_4$] = 185 g/l |
| Total return acid feed | $\dot{V}_H$ = 4.52 m$^3$/h |
| Return acid feed to stage 2 | Y · $\dot{V}_H$ = 1.78 m$^3$/h |
| Jarosite feed to stage 2 | $\dot{m}_J$ = 500 kg/h |

At the stage 2 the temperature was 95° C. and the concentrations at its various stages were:

| Reactor j | t$_j$/h | Σt$_j$/h | [Fe] g/l | [H$_2$SO$_4$] g/l | [NaJ] | [Na] | n$_{Zn}$ | n$_{Fe}$ |
|---|---|---|---|---|---|---|---|---|
| 1 | 0.5 | 0.5 | 35.8 | 39.4 | 210 | 9.6 | 0.456 | 0.055 |
| 2 | 0.5 | 1.0 | 35.8 | 33.4 | 220 | 9.2 | 0.522 | 0.175 |
| 3 | 1.0 | 2.0 | 34.8 | 27.3 | 236 | 8.4 | 0.609 | 0.227 |
| 4 | 1.0 | 3.0 | 32.6 | 25.3 | 252 | 7.6 | 0.674 | 0.335 |
| 5 | 1.0 | 4.0 | 30.1 | 24.8 | 267 | 6.9 | 0.728 | 0.437 |
| 6 | 1.0 | 5.0 | 27.6 | 25.1 | 281 | 6.2 | 0.774 | 0.532 |
| 7 | 1.0 | 6.0 | 25.2 | 25.5 | 294 | 5.6 | 0.814 | 0.618 |
| 8 | 1.0 | 7.0 | 23.1 | 26.2 | 306 | 5.1 | 0.849 | 0.694 |
| 9 | 1.0 | 8.0 | 21.2 | 26.8 | 316 | 4.6 | 0.879 | 0.761 |
| 10 | 1.0 | 9.0 | 19.4 | 27.6 | 325 | 4.2 | 0.905 | 0.821 |
| 11 | 1.0 | 10.0 | 17.8 | 27.6 | 333 | 3.8 | 0.926 | 0.875 |
| 12 | 1.0 | 11.0 | 16.2 | 28.4 | 340 | 3.5 | 0.945 | 0.922 |
| 13 | 1.0 | 12.0 | 14.9 | 30.5 | 346 | 3.2 | 0.959 | 0.964 |

The f$_i$ and S$_i$ values of ferrites in the last reactor were, by particle size class:

| particle size class | Reactor 13 f$_i$ | S$_i$ m$^2$/g |
|---|---|---|
| 1 | 0 | 0 |
| 2 | 0 | 0 |
| 3 | 0.147 | 1.5 |
| 4 | 0.818 | 0.67 |
| 5 | 0.035 | 0.41 |

In the process the total leach yield of zinc was 98.8%.

When the process was carried out without the stages 3 and 4, the process quantities deviating from those given above were:

| Reactor j | $t_j$ h | $\Sigma t_j$ h | [Fe] | [H$_2$SO$_4$] g/l | [NaJ] | [Na] | $n_{Zn}$ | $n_{Fe}$ |
|---|---|---|---|---|---|---|---|---|
| | | | | $V_H = 4.44$ m$^3$/h | | | | |
| | | | | $Y \cdot V_H = 1.64$ m$^3$/h | | | | |
| 1 | 0.5 | 0.5 | 25.8 | 69.4 | 182 | 9.9 | 0.026 | 0.001 |
| 2 | 0.5 | 1.0 | 30.4 | 50.0 | 187 | 9.7 | 0.322 | 0.041 |
| 3 | 1.0 | 2.0 | 33.1 | 34.0 | 198 | 9.2 | 0.440 | 0.111 |
| 4 | 1.0 | 3.0 | 32.5 | 27.8 | 211 | 8.5 | 0.515 | 0.196 |
| 5 | 1.0 | 4.0 | 30.7 | 25.4 | 226 | 7.8 | 0.573 | 0.287 |
| 6 | 1.0 | 5.0 | 28.5 | 24.7 | 240 | 7.2 | 0.620 | 0.373 |
| 7 | 1.0 | 6.0 | 26.3 | 24.5 | 252 | 6.6 | 0.661 | 0.455 |
| 8 | 1.0 | 7.0 | 24.3 | 24.6 | 264 | 6.0 | 0.698 | 0.530 |
| 9 | 1.0 | 8.0 | 22.2 | 25.0 | 276 | 5.5 | 0.732 | 0.601 |
| 10 | 1.0 | 9.0 | 20.4 | 25.2 | 286 | 5.0 | 0.762 | 0.663 |
| 11 | 1.0 | 10.0 | 18.8 | 25.5 | 295 | 4.6 | 0.790 | 0.720 |
| 12 | 1.0 | 11.0 | 17.3 | 25.8 | 303 | 4.2 | 0.813 | 0.772 |
| 13 | 1.0 | 12.0 | 15.9 | 26.1 | 310 | 3.8 | 0.835 | 0.819 |

The $f_i$ and $S_i$ values of ferrites in the feed and in the last reactor were, by particle size class:

| Particle size class i | Feed | | Reactor 13 | |
|---|---|---|---|---|
| | $f_{io}$ | $S_{io}$ m$^2$/g | $f_i$ | $S_i$ m$^2$/g |
| 1 | 0.066 | 1.2 | 0 | 0 |
| 2 | 0.133 | 0.68 | 0 | 0 |
| 3 | 0.135 | 0.47 | 0.018 | 1.7 |
| 4 | 0.256 | 0.34 | 0.173 | 0.71 |
| 5 | 0.201 | 0.26 | 0.274 | 0.42 |
| 6 | 0.156 | 0.18 | 0.356 | 0.25 |
| 7 | 0.053 | 0.12 | 0.179 | 0.14 |

The total leach yield of zinc in the process was 97.2%.

The linking of the stages 3 and 4 increased the total leach yield of zinc by 1.6 percentage points.

The symbols $n_{Zn}$ and $n_{Fe}$, respectively, in the example represent the degree to which Reaction (2) and the Sum Reaction (1) have proceeded.

EXAMPLE 2

The coupling of the leach system was the embodiment shown in FIG. 2, in which the total output of the mill was fed to the stage 2.

The analysis of the zinc calcine as regards the components discussed herein is given below. The zinc compound concentrations and the distribution of zinc over the zinc compounds present in the calcine are also given.

| | Analysis of calcine % | Zinc compounds in calcine | % | Distribution of zinc over zinc compounds in calcine/% |
|---|---|---|---|---|
| Zn | 58.3 | ZnO | 59.9 | 82.5 |
| Fe | 12.2 | ZnSO$_4$ | 6.6 | 4.5 |
| S$_s$ | 0.2 | ZnFe$_2$O$_4$ | 26.3 | 12.3 |
| S$_{SO4}$ | 1.3 | ZnS | 0.6 | 0.7 |
| Cu | 0.94 | | | |
| Cd | 0.21 | | | |

The particle size distribution of the ferritic solid material fed from the neutral leach to the hydrocyclone 3 was as follows:

| i | d/μm | $f_{io}$ |
|---|---|---|
| 1 | −5 | 0.038 |
| 2 | 5–10 | 0.217 |
| 3 | 10–20 | 0.070 |
| 4 | 20–37 | 0.313 |
| 5 | 37–74 | 0.129 |
| 6 | 74–149 | 0.170 |
| 7 | 149– | 0.063 |

The solid content of the underflow of the hydrocyclone 3 was 850 g/l and its particle size distribution was:

| Sieve mesh μm | Passage through the sieve % |
|---|---|
| 425 | 95.1 |
| 149 | 84.7 |
| 74 | 49.2 |
| 53 | 34.8 |
| 37 | 21.1 |
| 20 | 9.8 |

After a milling time of 30 min the particle size distribution of the solid passing from the mill 6 to the stage 2 was as follows:

| Sieve mesh μm | Passage through the sieve % |
|---|---|
| 425 | 100 |
| 149 | 99.2 |
| 74 | 96.9 |
| 53 | 72.6 |
| 37 | 58.9 |
| 20 | 27.3 |

The particle size distribution of the solid in the overflow of the hydrocyclone 3 was as follows:

| Sieve mesh μm | Passage through the sieve % |
|---|---|
| 53 | 100 |
| 37 | 99.9 |
| 20 | 50.9 |
| 10 | 39.9 |
| 5 | 5.9 |

The combined solid material from the mill 6 and the thickener 5, passing to the stage 2, had the following particle size distribution and specific surface area:

| i | d/μm | $f_{io}$ | $S_{io}/m^2g^{-1}$ |
|---|---|---|---|
| 1 | −5 | 0.169 | 2.0 |
| 2 | 5–10 | 0.334 | 1.1 |
| 3 | 10–20 | 0.121 | 0.76 |
| 4 | 20–37 | 0.362 | 0.55 |
| 5 | 37–74 | 0.011 | 0.40 |
| 6 | 74–149 | 0.003 | 0.28 |

The ferrite treatment stage comprised a 4-part series reactor, the retention times of the reactors being 1, 1, 2, and 4 h, i.e. a total retention time of 8 h.

The results of the experiment have been calculated as per a calcine feed of $\dot{m}_p = 1$ t/h.

Using the symbols explained above, the quantities illustrating the behavior of the leaching process were as follows:

| | |
|---|---|
| Sulfuric acid concentration of return acid | $[H_2SO_4]$ = 180 g/l |
| Total return acid feed | $\dot{V}_H$ = 4.80 m³/h |
| Return acid feed to stage 2 | $Y \cdot \dot{V}_H$ = 1.90 m³/h |
| Jarosite J' feed to stage 2 | $\dot{m}_{J'}$ = 285 kg/h |

At the stage 2 the temperature was 95° C. and the concentrations in the various reactors were:

| Reactor $j$ | $\frac{t_j}{h}$ | $\frac{\Sigma t_j}{h}$ | [Fe] | [H₂SO₄] g/l | [NaJ] | [Na] | $\eta_{Zn}$ | $\eta_{Fe}$ |
|---|---|---|---|---|---|---|---|---|
| 1 | 1 | 1 | 32.7 | 41.2 | 134 | 10.8 | 0.464 | 0.106 |
| 2 | 1 | 2 | 30.2 | 29.6 | 168 | 9.2 | 0.647 | 0.341 |
| 3 | 2 | 4 | 22.5 | 27.3 | 217 | 6.9 | 0.832 | 0.682 |
| 4 | 4 | 8 | 15.6 | 28.0 | 257 | 5.0 | 0.967 | 0.958 |

The $f_i$ and $S_i$ values of ferrites were, by reactor and particle size class:

| Reactor j | 0 | | 1 | | 2 | | 3 | | 4 | |
|---|---|---|---|---|---|---|---|---|---|---|
| particle size class i | $f_{io}$ — | $S_{io}$ m²/g | $f_i$ — | $S_i$ m²/g | $f_i$ — | $S_i$ m²/g | $f_i$ — | $S_i$ m²/g | $f_i$ — | $S_i$ m²/g |
| 1 | 0.169 | 2.0 | 0.068 | 3.3 | 0.019 | 5.7 | 0 | 0 | 0 | 0 |
| 2 | 0.334 | 1.1 | 0.300 | 1.4 | 0.254 | 1.6 | 0.125 | 2.7 | 0 | 0 |
| 3 | 0.121 | 0.76 | 0.137 | 0.90 | 0.143 | 1.0 | 0.133 | 1.3 | 0.036 | 3.5 |
| 4 | 0.362 | 0.55 | 0.474 | 0.62 | 0.558 | 0.67 | 0.701 | 0.80 | 0.866 | 1.3 |
| 5 | 0.011 | 0.40 | 0.016 | 0.44 | 0.020 | 0.46 | 0.030 | 0.52 | 0.066 | 0.68 |
| 6 | 0.003 | 0.28 | 0.005 | 0.30 | 0.006 | 0.31 | 0.101 | 0.34 | 0.032 | 0.40 |

The total leach yield of zinc in the process was 99.0%.

When the process was carried out without the stages 3 and 6, the process quantities deviating from those given above were as follows:

| | | | | | | | | |
|---|---|---|---|---|---|---|---|---|
| | | | $\dot{V}_H$ = 4.74 m³/h | | | | | |
| | | | $Y \cdot \dot{V}_H$ = 1.85 m³/h | | | | | |
| Reactor $j$ | $\frac{t_j}{h}$ | $\frac{\Sigma t_j}{h}$ | [Fe] | [H₂SO₄] g/l | [NaJ] | [Na] | $\eta_{Zn}$ | $\eta_{Fe}$ |
| n | 1 | 1 | 31.4 | 45.8 | 120 | 10.6 | 0.363 | 0.064 |
| 2 | 1 | 2 | 31.3 | 32.3 | 145 | 0.4 | 0.522 | 0.231 |
| 3 | 2 | 4 | 24.4 | 28.5 | 191 | 7.2 | 0.701 | 0.546 |
| 4 | 4 | 8 | 16.9 | 27.3 | 237 | 5.0 | 0.866 | 0.860 |

| Reactor j | 0 | | 1 | | 2 | | 3 | | 4 | |
|---|---|---|---|---|---|---|---|---|---|---|
| particle size class i | $f_{io}$ — | $S_{io}$ m²/g | $f_i$ — | $S_i$ m²/g | $f_i$ — | $S_i$ m²/g | $f_i$ — | $S_i$ m²/g | $f_i$ — | $S_i$ m²/g |
| 1 | 0.038 | 2.0 | 0.010 | 3.6 | 0.001 | 7.7 | 0 | 0 | 0 | 0 |
| 2 | 0.217 | 1.1 | 0.146 | 1.4 | 0.097 | 1.8 | 0.027 | 3.2 | 0 | 0 |
| 3 | 0.070 | 0.76 | 0.062 | 0.92 | 0.053 | 1.1 | 0.034 | 1.4 | 0.003 | 4.2 |
| 4 | 0.313 | 0.55 | 0.327 | 0.63 | 0.325 | 0.69 | 0.295 | 0.83 | 0.156 | 1.4 |
| 5 | 0.129 | 0.40 | 0.151 | 0.44 | 0.165 | 0.47 | 0.182 | 0.53 | 0.177 | 0.70 |
| 6 | 0.170 | 0.28 | 0.217 | 0.30 | 0.253 | 0.32 | 0.316 | 0.35 | 0.423 | 0.41 |
| 7 | 0.063 | 0.19 | 0.087 | 0.19 | 0.106 | 0.20 | 0.146 | 0.21 | 0.241 | 0.23 |

The total leach yield of zinc in the process was 97.7%.

The linking of the stages 3 and 6 to the leaching process increased the total leach yield of zinc by 1.3 percentage points.

The symbols $\eta_{Zn}$ and $\eta_{Fe}$, respectively, in the examples represent the degrees to which Reaction (2) and Sum Reaction (1) have proceeded.

What is claimed is:

1. In a hydrometallurgical process for the treatment of a raw material containing an oxide and a ferrite of one or more of the non-ferrous metals zinc, copper and cadmium, comprising neutral leaching said raw material with a sulfuric acid bearing solutin to produce ferritic solid material and a sulfate solution of the non-ferrous metal, separating said sulfate solution from said ferritic solid material to recover the non-ferrous metal from said solution, treating said ferritic solid material in a ferrite treatment stage with additional sulfuric acid bearing solution in the presence of an ion of potassium, sodium or ammonium under atmospheric pressure at a temperature of about 80° C. to 105° C. to precipitate iron from the ferritic material in the form of jarosite and a solution containing dissolved non-ferrous metal and returning said solution to the neutral leaching stage, wherein the improvement comprises classifying the ferritic solid material from said neutral leaching stage into a finer fraction and a coarser fraction, substantially all of the particles in said finer fraction having a particle size under 37 μm and most of said coarser fraction being in the form of particles larger than 37 μm, feeding the finer fraction to said ferrite treatment stage, comminuting said coarser fraction and recycling the comminuted fraction to the ferrite treatment stage.

2. A process according to claim 1 in which at maximum 50% of the ferritic solid material obtained from the neutral leach is subjected to said comminuting and reduced in size at least to the particle size distribution of the finer fraction.

3. A process according to claim 1 in which the coarser fraction is comminuted in an agitated fluidized-bed reactor by means of a sulfuric acid bearing solution.

4. A process according to claim 1 in which the comminuted fraction is fed directly to the ferrite treatment stage.

5. A process according to claim 1 in which said comminution is accomplished by milling and a hydrocyclone is used to carry out said classifying to produce said finer fraction as an overflow and said coarser fraction as an underflow and the overflow is fed to the ferrite treatment stage whereas the underflow is returned to the neutral leach.

6. A process according to claim 1 in which 30–40% of the ferritic solid material obtained from the neutral leach is separated and comminuted at least to the particle size distribution of the finer fraction.

* * * * *

UNITED STATES PATENT AND TRADEMARK OFFICE
CERTIFICATE OF CORRECTION

PATENT NO. : 4,383,979

DATED : May 17, 1983

INVENTOR(S) : Jussi K. Rastas et al

It is certified that error appears in the above—identified patent and that said Letters Patent is hereby corrected as shown below:

Column 11, line 7, under column "$n_{Zn}$", "0.026" should read --0.206--.

Signed and Sealed this

Twenty-sixth Day of July 1983.

[SEAL]

Attest:

GERALD J. MOSSINGHOFF

*Attesting Officer*     *Commissioner of Patents and Trademarks*